United States Patent [19]
Kitaue

[11] Patent Number: 5,213,327
[45] Date of Patent: May 25, 1993

[54] GAME APPARATUS
[75] Inventor: Kazumi Kitaue, Saitama, Japan
[73] Assignee: Konami Co. Ltd., Japan
[21] Appl. No.: 781,867
[22] Filed: Oct. 24, 1991
[51] Int. Cl.⁵ .............................................. A63F 9/22
[52] U.S. Cl. .................. 273/148 B; 273/433; 273/434; 273/438
[58] Field of Search .............. 273/85 G, 148 B, 433, 273/434, 438

[56] References Cited
U.S. PATENT DOCUMENTS

| | | | |
|---|---|---|---|
| D. 320,018 | 9/1991 | Bakanowsky, III | 273/148 B X |
| 4,568,080 | 2/1986 | Yokoi | 273/434 |
| 4,575,591 | 3/1986 | Zugaresi | 273/438 X |
| 4,976,429 | 12/1990 | Nagel | 273/85 G X |
| 5,091,832 | 2/1992 | Tortola et al. | 273/434 X |

FOREIGN PATENT DOCUMENTS 1989-97948 4/1991 Japan .
2226768 7/1990 United Kingdom ............ 273/85 G Primary Examiner—V. Millin
Assistant Examiner—Raleigh W. Chiu
Attorney, Agent, or Firm—Welsh & Katz, Ltd.

[57] ABSTRACT

Game apparatus for use with a hand-holdable video game device of the type having a video display screen, at least one depressible control button, and at least one multi-position operating control operative to "play" the video game. The game apparatus includes a housing adapted for support on a generally horizontal support surface and having a recess to receive the video game in predetermined relation. A magnifying lens overlies and magnifies the display screen on the video game. The game apparatus has depressible control knobs and an upstanding joystick operative to selectively actuate the control buttons and multi-position control on the video game, thereby enabling two-handed play of the video game in a manner simulating play of large-scale video games.

17 Claims, 4 Drawing Sheets

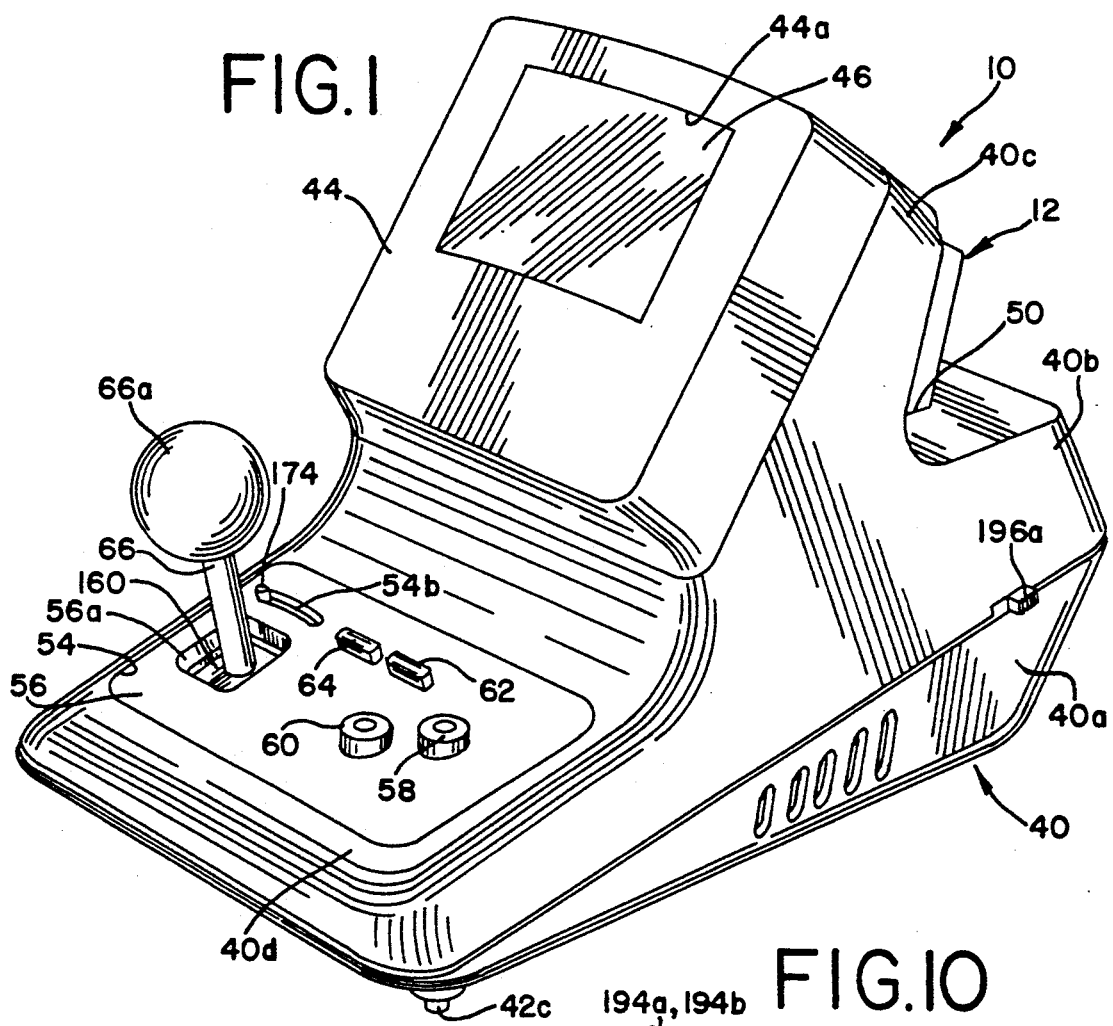
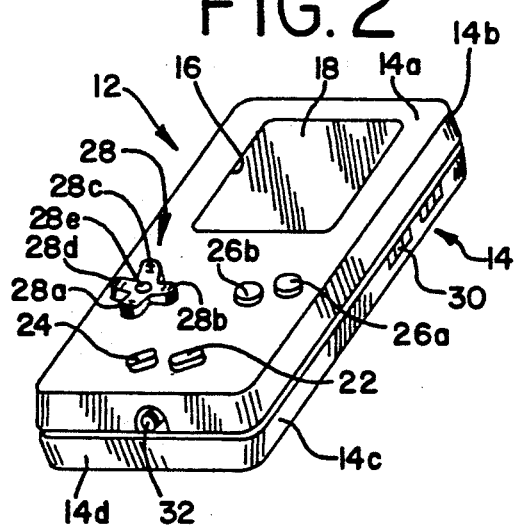
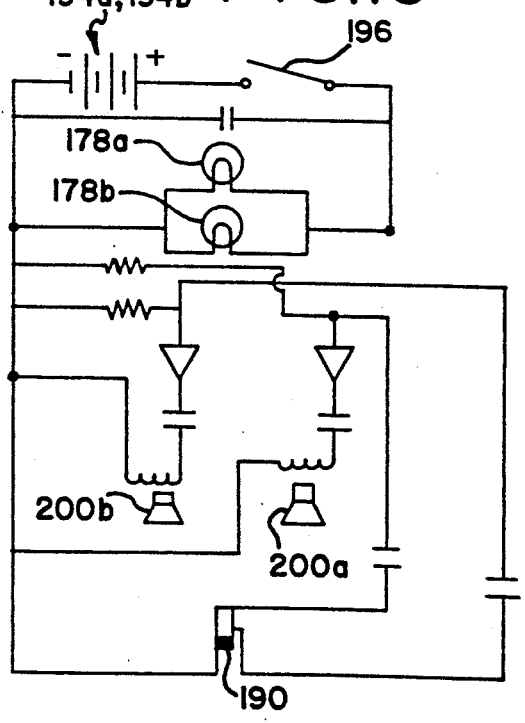

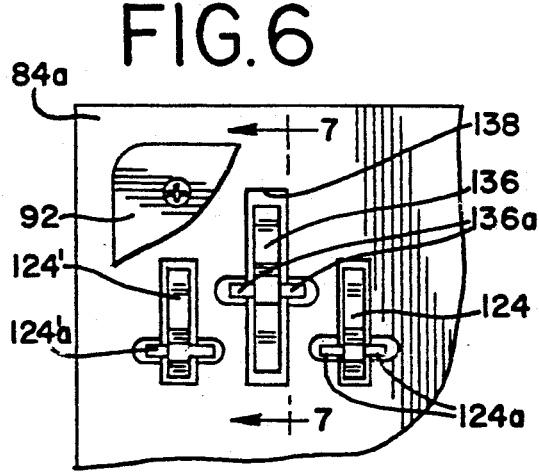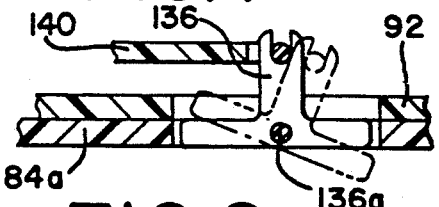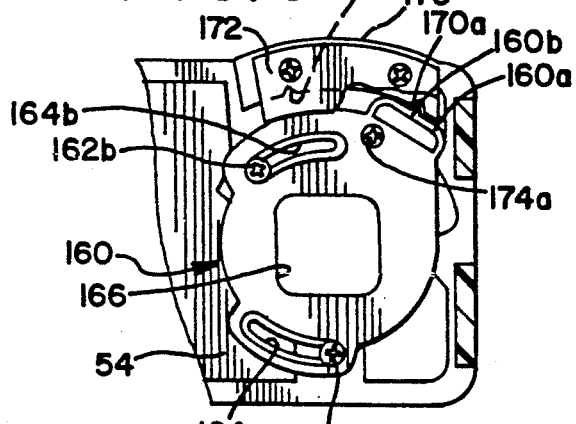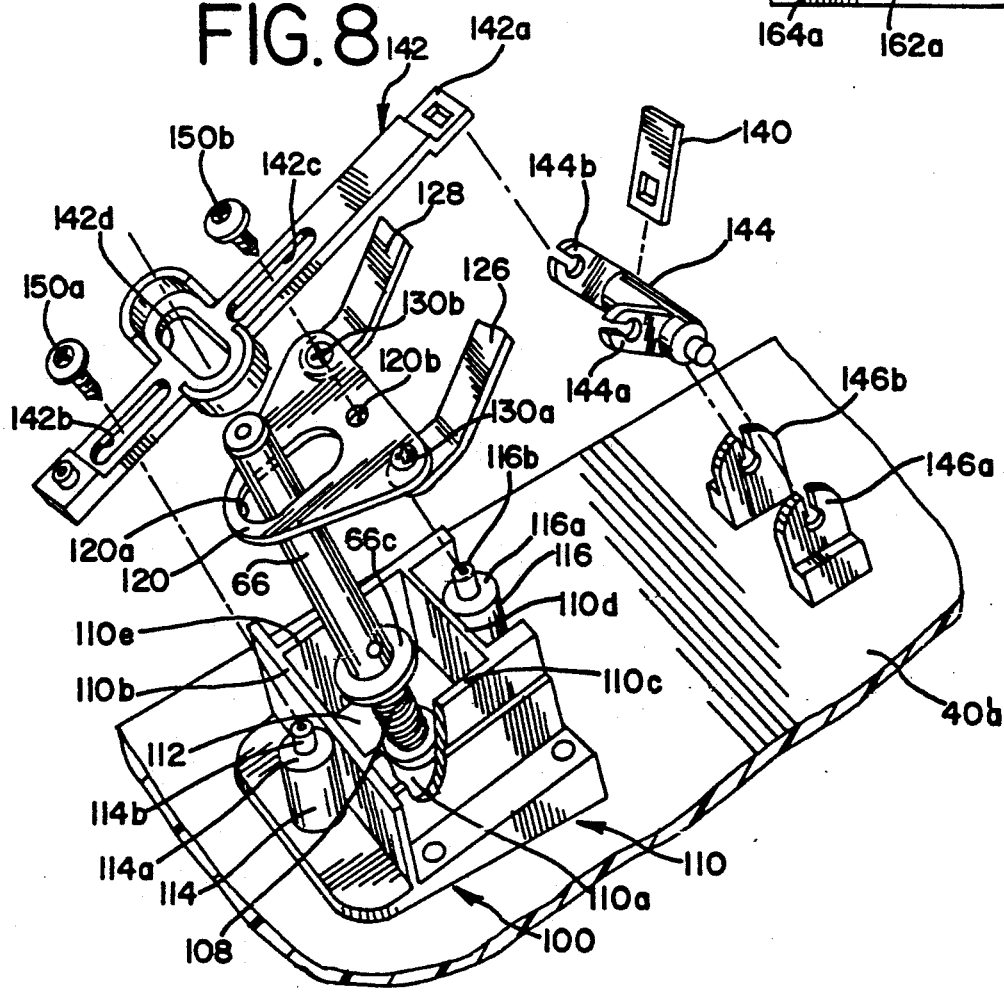

GAME APPARATUS

BACKGROUND OF THE INVENTION

The present invention relates generally to game apparatus, and more particularly to a novel game apparatus for use with a hand-holdable video game device or the like having depressible controls for varying operating functions of the video game, the game apparatus having a joystick and depressible control knobs operative to control the video game device when supported within a recess in the game apparatus.

The popularity of video games, and particularly compact models having housings adapted to be held in one hand of the user during operation, has reached major proportions. The housings of such video games generally support a video display screen exposed through an upper surface of the housing. Control levers, buttons and/or knobs are generally supported at convenient locations to enable an operator to readily manipulate the various controls with one hand while holding the video game in the other hand. A drawback of many hand-held video games of known design is that the video display, which may comprise an LCD screen, presents the display characters or scenes in relatively small scale so as to make it difficult for some persons to readily discern the displayed characters or images. Further, while the hand-holdable video games are convenient to operate on a personalized basis because of their relatively small size, larger size video games, such as found in commercial game arcades and the like, frequently employ a joystick control in addition to depressible control buttons or knobs. The joystick is movable in fore-and-aft and side-to-side motions and has been found to give the operator a greater sense of agility and control over various related functions of the video game as displayed on a relatively large display screen. Accordingly, a game apparatus adapted for cooperation with hand-held type video games and which enhances viewing of the video display by magnification and employs a joystick and depressible controls operable by both hands of the user to control various functions of the video game would greatly simulate many desired features of popular larger-scale commercial video games.

SUMMARY OF THE INVENTION

One of the primary objects of the present invention is to provide a game apparatus for use with compact hand-holdable video games and which enables two-handed operation of such video games in a table-top mode with controls closely resembling large-scale commercial video games.

A more particular object of the present invention is to provide a novel game apparatus for use with a compact video game of the type having a generally hand-holdable size housing through which an LCD screen is exposed and having a plurality of operator control buttons for playing the video game, the game apparatus having a recess to receive the video game in predetermined relation, a magnifying lens operative to enlarge the image displayed on the LCD screen, and operator control knobs and associated linkage means enabling two-handed control to manipulate the control buttons on the video game in similar fashion to a much larger scale video game.

A feature of the game apparatus in accordance with the invention lies in the provision of a housing adapted to be supported on a table top or the like, the housing having an upwardly inclined portion defining a recess to receive a compact hand-holdable video game, a magnifying lens supported to overlie the LCD screen of a video game positioned within the recess, and illumination means operative to illuminate the LCD screen so as to enhance characters and/or images thereon.

Another feature of the game apparatus in accordance with the invention lies in the provision of an upstanding joystick control supported by the apparatus housing and manipulable to selectively depress a multi-position control on the video game so as to effect movement of a character or image or the like on the LCD screen along generally vertical and horizontal axes.

Another feature of the game apparatus in accordance with the invention lies in the provision of an electrical circuit carried by the game apparatus and cooperative with the compact video game to transfer sound generated by the video game to larger size stereophonic speakers carried by the game apparatus.

Further objects, features and advantages of the present invention, together with the organization and manner of operation thereof, will become apparent from the following detailed description of invention when taken with the accompanying drawings wherein like reference numbers designate like elements throughout the several views.

BRIEF DESCRIPTION OF THE DRAWINGS

FIG. 1 is a perspective view of a game apparatus constructed in accordance with the present invention;

FIG. 2 is a perspective view of a hand-holdable video game device of the type employed with the game apparatus of FIG. 1;

FIG. 6 is a fragmentary view illustrating the manner of pivotally supporting the various actuating arms shown in FIG. 5;

FIG. 7 is a fragmentary sectional view taken substantially along line 7—7 of FIG. 6;

FIG. 8 is a fragmentary exploded perspective view illustrating further details of the joystick and associated control elements shown in FIG. 5;

FIG. 9 is a fragmentary view taken substantially along line 9—9 of FIG. 4; and

FIG. 10 is a schematic circuit diagram of the electrical circuit employed in the game apparatus of FIG. 1.

DETAILED DESCRIPTION

Figure 3:
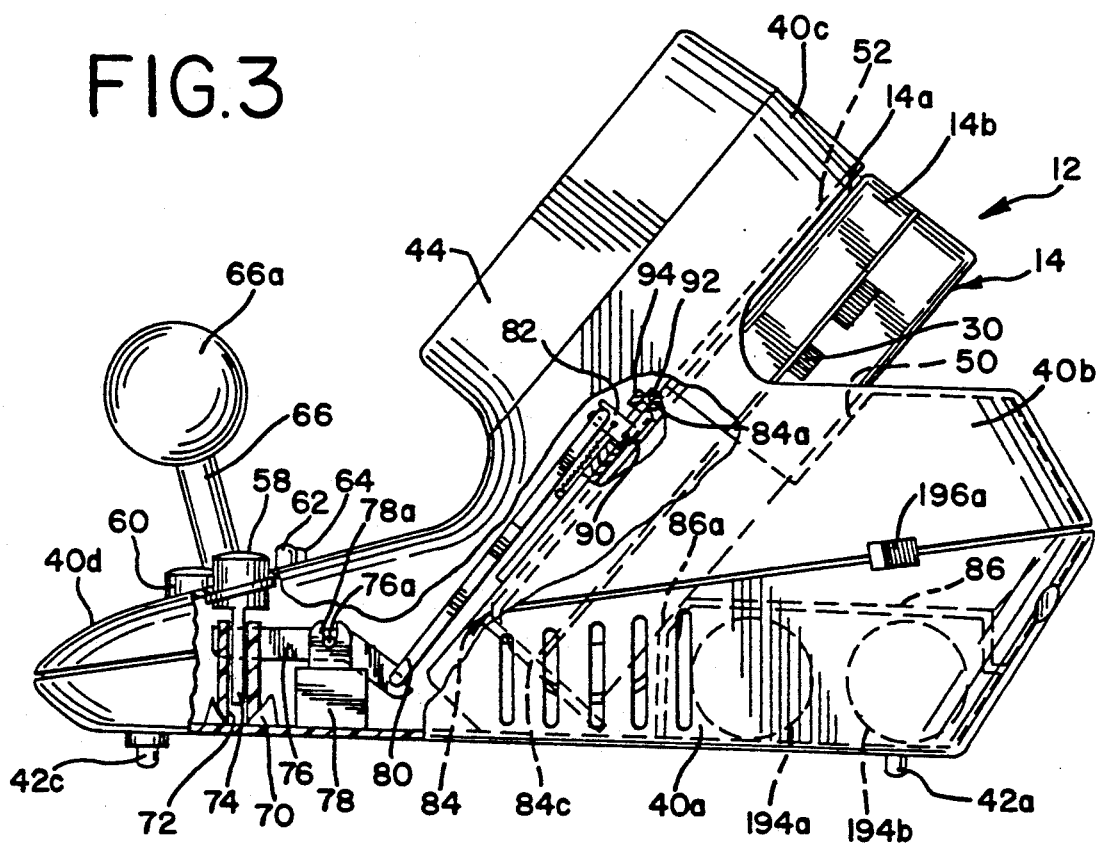
FIG. 3 is a side elevational view of the game apparatus of FIG. 1 having portions broken away for purposes of clarity.

Referring now to the drawings, and in particular to FIGS. 1 and 2, a game apparatus constructed in accordance with the present invention is indicated generally at 10. The game apparatus 10 finds application with a compact hand-holdable type video game, such as indicated generally at 12 in FIG. 2. The game apparatus 10 is adapted to receive the hand-held video game 12 in predetermined relation therewith and enables two-handed manipulation of various controls on the video game through operator control means simulating a larger scale video game such as generally found in commercial video game arcades and the like.

As illustrated in FIG. 2, the hand-held type video game 12 includes a generally rectangular housing 14 having an upper surface 14a in which is formed a rectangular opening 16 enabling viewing of a video display screen 18, such as a conventional LCD screen. A plurality of control buttons extend upwardly through suitable openings in the upper surface 14a of the housing 14 and are manipulatable to control various modes of operation of the video game 12. The video game 12 is representative of many commercially available hand-held video games which enable insertion of a game cartridge having a game format programmed on a ROM. The game cartridge is loaded within a suitable recess or chamber within the video game housing 14, such as through a suitable recess (not shown) accessible from a rear end 14b of the housing. In the illustrated video game 12, a "start" mode control button 22 and a "select" mode control button 24 extend upwardly through the upper surface 14a of the video game housing 14 to enable starting of a game mode and responding to instructions displayed on the video display screen under the control of the game format programmed on the ROM. Two additional depressible control buttons, such as indicated at 26a and 26b, extend upwardly from the upper surface 14a of the video game housing for controlling other operating characteristics of the video game device 12.

A multi-position operating control 28 of generally X-shape or cross-arm configuration also extends upwardly through the upper surface 14a of the video game housing 14. The multi-position control 28 defines four arm portions 28a-d which lie on generally mutually perpendicular axes substantially parallel and transverse, respectively, to the longitudinal axis of the video game housing 14. The arm portions 28a-d are selectively depressible about a common center axis 28e to enable selective controlled movement of a character or image on the video display screen 18 along right-angle X and Y coordinates within the video display screen. It will be understood that the multi-position control 28 may take other configurations or forms. For example, video games are commercially available from Konami Inc. which employ a two position control operative to effect bidirectional movement of an image character along the Y axis on the associated video display screen.

The video game 12 includes an internal power source, such as suitable battery power means (not shown), operative to energize the video game through the "start" mode control button 22. A volume control 30 is accessible along a side 14c of the video game housing 14. An earphone jack 32 is accessible from a front end surface 14d on the video game housing 14. As will be described, the earphone jack 32 facilitates an electrical connection of the internal sound circuit of the video game 12 to stereophonic speaker means carried within the game apparatus 10.

Referring to FIGS. 3-8, taken in conjunction with FIGS. 1 and 2, the game apparatus 10 includes a housing 40 which may be made of a suitable plastic material and has a base portion 40a adapted to be placed on a horizontal support surface, such as a table top or the like. The base portion 40a preferably has corner support legs in the form of a pair of rear corner legs 42a and 42b and a pair of adjustable length front corner legs 42c and 42d. The apparatus housing 40 has an upper portion 40b which releasably interfaces with the base portion 40a and has an integral upwardly inclined portion 40c inclined upwardly from horizontal at approximately 45°. The upwardly inclined housing portion 40c supports a rectangular magnifying lens support frame 44 having a rectangular opening 44a in which is supported a generally rectangular magnifying lens 46.

Figure 5:
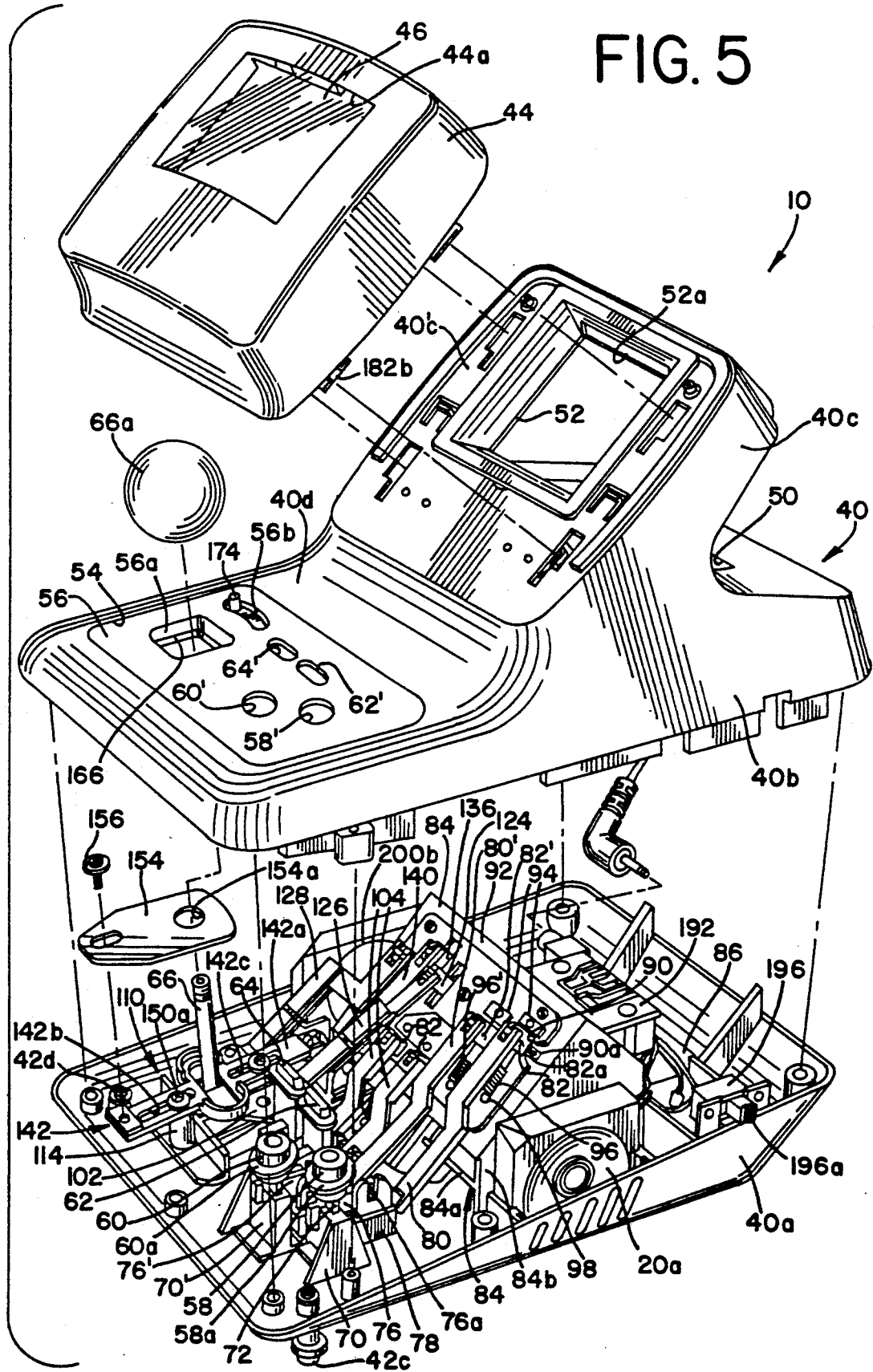
FIG. 5 is an exploded perspective view of the game apparatus of FIG. 1.

The game apparatus housing 40 has a generally rectangular recess 50 adapted to receive the video game housing 14 such that the upper surface 14a of the video game housing lies in juxtaposed relation to a wall 52 which defines a lower surface of the upwardly inclined housing portion 40c, as illustrated in FIGS. 3 and 5. The wall 52 has a rectangular opening 52a which exposes the video display screen for visual observation through the magnifying lens 46 when the video game is disposed within the recess 50.

The upper housing portion 40b of the game apparatus housing 40 has a forward upwardly inclined surface 40d having a rectangular opening 54 in which is supported a similarly configured rectangular cover plate 56. The base portion 40a of the apparatus housing 40 supports first operator means in the form of a plurality of depressible control knobs, indicated at 58, 60, 62 and 64, which extend upwardly through suitable corresponding openings 58', 60', 62' and 64' in the cover plate 56. These control knobs, when depressed, cooperate with linkage means to actuate or depress the control buttons 26a, 26b, 22 and 24, respectively, on the video game device 12 when inserted within the recess 50.

The apparatus housing 40 also supports second operator means in the form of a generally upstanding cylindrical shank joystick 66 which extends upwardly through a rectangular opening 56a in the cover plate 56. A spherical knob 66a is mounted on the upper end of the joystick to facilitate manipulation of the joystick. The joystick 66 and associated linkage means, to be hereinafter described, are operable to selectively depress the individual arm portions 28a-d of the cross-arm control 28 on the video game 12.

Referring particularly to FIGS. 3 and 5, the depressible control knob 58 and associated linkage means operable to depress the control button 26a on the video game 12 will be described in detail as being generally representative of the manner in which the control knobs 60, 62 and 64 operate to control the control buttons 26b, 22 and 24, respectively, on the video game device 12 when disposed within the recess 50. The control knob 58 is supported for vertical movement by a support guide 70 which may be formed of plastic integral with the plastic housing base 40a and defines a vertical channel 72 to receive a bifurcated arm 74 fixed to or formed axially integral with the underside of control button 58. The bifurcated arm 74 strattles one end of a link 76 which is pivotally mounted on an upstanding pivot block 78 through a transverse pivot pin 76a. The end of link 76 opposite the bifurcated arm 74 is pivotally connected to one end of an elongated transfer link 80 which has its opposite end pivotally connected to an L-shaped actuating arm 82. The actuating arm 82 is pivotally supported on an angularly upwardly inclined wall 84a formed on a support bracket 84 having opposite end walls, one of which is indicated at 84b in FIG. 5, fixed to opposite ends of the inclined wall 84a and having their lower ends secured to the base 40a of the apparatus housing 40. The wall 84a is generally coplanar with the inclined wall 52 on the upwardly inclined housing portion 40c and cooperates with a transverse base wall 84c of the bracket 84 and an inclined wall portion 86a of a battery chamber wall 86 to define the lower portion of the recess 50 which receives the video game device 12.

The L-shaped actuating arm 82 is received within a suitable rectangular opening 90 in the wall 84a and has a transverse pivot pin 82a which extends outwardly from both sides of the actuating arm and is received within suitable recesses, one of which is indicated at 90a in FIG. 5, to enable pivotal movement of the actuating arm. A cover plate 92 is secured against the wall 84a and retains the pivot pin 82a within its pivot recesses. A stop member 94 is fixed to the cover plate 92 to limit pivotal movement of the actuating arm 82 in a counter-clockwise direction about its pivot axis 82a, as considered in FIG. 5. The actuating arm 82 is biased to a retracted position within the opening 90 abutting the stop member 94 by a coil tension spring 96 having one end connected to the actuating arm 82 and having its opposite end secured to the cover plate 92 as through a post or screw 98. The tension of spring 96 is sufficient to bias the pivot link 76 to a position wherein the control knob 58 is urged upwardly within its corresponding circular opening 58' so that an annular flange 58a on the control knob engages the underside of the cover plate 56. The actuating arm 82 and its associated opening 90 in wall 84a are positioned relative to the recess 50 such that depressing the control knob 58 pivots the actuating arm 82 into recess 50 and depresses the control button 26a on the video game 12 when disposed within the recess 50.

In similar fashion to the control knob 58, the control knob 60 is slidably supported in a support guide 70' and is interconnected to an actuating arm 82, through a pivot link 76' and an elongated connecting link 80'. The actuating arm 82' is substantially identical to the actuating arm 82 and is similarly pivotally supported on the wall 84a so as to pivot into the recess 50 and actuate the control button 26b on the video game 12 in response to depressing of the control knob 60. The control knob 60 is similarly biased upwardly through opening 60' in cover plate 56 by a tension spring 96' such that an annular flange 60a engages the underside of the cover plate.

The depressible control knobs 62 and 64 are similarly supported for vertical movement by a common support guide 102. Each of the control knobs 62 and 64 is cooperable with a corresponding pivot link identical to pivot link 76 and a connecting link 104 to actuate an associated L-shaped pivotal actuating arm 82 so as to depress a corresponding one of the control buttons 22 and 24 on the video game 12 when disposed within the recess 50.

As aforedescribed, the joystick 66 is operative to selectively depress the arm portions 28a-d of the multi-position control 28 on the video game device 12 when disposed within the recess 50. Referring particularly to FIGS. 4-8, the joystick 66 has a coil spring 108 fixed coaxially to its lower end as illustrated in FIG. 8. The lower end of the coil spring 108 is fixed to a bottom surface 110a of an upstanding support framework 110 such that the joystick extends upwardly and is biased to a neutral position generally centrally within a rectangular recess 112 defined by upstanding walls 110b-e of the framework 110. The framework 110 is fixed to a bottom surface 40'a of the apparatus base housing 40a and is configured such that the upper edges of the walls 110b-e are substantially coplanar. The framework 110 may be made of a suitable plastic material and also has a pair of upstanding bosses 114 and 116 formed integral with or otherwise suitably secured to the framework such that the axes of the cylindrical bosses 114 and 116 lie in a substantially vertical plane parallel to the longitudinal axis of the apparatus housing 40 and containing the longitudinal axis of the joystick 66 when in a neutral upstanding condition. The bosses 114 and 116 have upper annular surfaces 114a and 116a formed thereon in substantially coplanar relation with the coplanar upper edge surfaces of the walls 110b-e, and have corresponding upwardly extending cylindrical coaxial guide pins 114b and 116b for purposes to be described.

A generally triangular shaped actuating plate 120 has an elongated slot 120a formed therethrough of a transverse width slightly greater than the diameter of the joystick 66 so as to enable the joystick to extend upwardly through the elongated slot. The actuating plate 120 has a circular opening 120b located to receive the guide pin 116b when the actuating plate is assembled over the joystick 66 with the lower surface of the actuating plate slidably engaging the upper coplanar edges of the sidewalls 110b-e. In this manner, the actuating plate 120 is pivotal about the axis of guide pin 116b in response to movement of the joystick in a direction having a lateral or side-to-side component. An annular flange 66b on the joystick 66 adjacent its lower end prevents the joystick from being inadvertently pulled upwardly through the elongated slot 120a in the actuating plate 120.

Any movement of the joystick 66 having a transverse or lateral component effects pivotal actuation of a corresponding pair of L-shaped actuating arms 124 and 124' which are substantially identical to the actuating arm 82. As illustrated in FIG. 6, the actuating arms 124 and 124' are pivotally supported within corresponding rectangular openings through the wall 84a by respective pivot pins 124a and 124'a which are received within correspondingly shaped recesses intersecting the rectangular openings similar to pivotal support of the actuating arm 82. The actuating arms 124 and 124' are interconnected, respectively, to the actuating plate 120 through linkage means in the form of a pair of connecting links 126 and 128 which have their lower ends pivotally connected to the forward corners of the triangular actuating plate through suitable connector screws such as indicated at 130a and 130b in FIG. 8. The connecting links 126 and 128 are preferably interrupted or split at approximately their mid-points and have corresponding threaded connector shafts interconnecting the adjacent ends to facilitate adjustment of the overall length of each connecting link.

Movement of the joystick 66 from its neutral position to create a left-to-right lateral or transverse component, as considered from the forward end of the housing 40, serves to rotate the actuating plate 120 about the pivot axis 116b to effect forward movement of the link 126 while simultaneously effecting an equal and opposite rearward movement of link 128. Such movement causes the actuating arm 124 to project into the recess 50 at a position to engage and depress the arm portion 28b of the multi-position control 28 on the video game 12. Conversely, a right-to-left movement of the joystick 66 from its neutral position will effect pivotal movement of the corresponding actuating arm 124' into the recess 50 to depress arm portion 28d of control 28 while simultaneously retracting the actuating arm 124 and releasing the control arm portion 28b.

Movement of the joystick 66 in a fore-and-aft direction, that is, in a generally forward or rear direction relative to the apparatus housing 40, is operative to effect a corresponding pivotal movement of an inverted T-shaped actuating arm 136 which is pivotally supported within a rectangular opening 138 in the wall 84a through a pivot pin 136a in similar fashion to the actuating arm 82, as illustrated in FIGS. 6 and 7. The actuating arm 136 is responsive to forward and rear movement of the joystick to depress the arm portions 28c and 28a, respectively, of the multi-position control 28 on the video game 12.

The actuating arm 136 is interconnected to the joystick 66 through a connecting link 140 having one end pivotally connected to the actuating arm 136 and having its opposite end pivotally interconnected to the end 142a of a slide control member 142. In the illustrated embodiment, a transfer member 144 is pivotally supported transversely of the bottom wall 40'a of the apparatus housing 40 by a pair of laterally spaced support members 146a and 146b as illustrated in FIG. 8. The transfer member 144 has a pair of equal length radial arms 144a and 144b which are angularly offset relative to the pivot axis of the transfer member. The radial arm 144a is pivotally connected to the forward end of the connecting link 140, and the radial arm 144b is pivotally connected to the end 142a of the slide control member 142, thus enabling lateral offsetting of the connecting link 140 from the slide control member 142.

The slide control member 142 includes a pair of elongated slots 142b and 142c which extend longitudinally of the control member on opposite sides of a transverse elongated slot 142d having a width slightly greater than the diameter of the joystick 66. The control member 142 is assembled over the joystick 66 so that the elongated slots 142b and 142c receive the guide pins 114b and 116b therethrough. A pair of retaining screws 150a and 150b are threaded into the tops of the guide pins 114b and 116b so as to retain the control member 142 in assembled relation on the actuating member 120 while enabling longitudinal movement of the control member in response to fore-and-aft movement of the joystick. The longitudinal length of the transverse elongated slot 142 is sufficient to allow full movement of the joystick in a direction transverse to the longitudinal axis of the apparatus housing 40 without being hindered by the control member 142. On the other hand, movement of the joystick in a direction having a fore-and-aft component effects a corresponding fore-and-aft movement of the control member 142, thereby effecting a corresponding forward or rearward pivotal movement of the actuating arm 136 to selectively depress the arm portions 28a and 28c on the multi-position control 28 of the video game device 12.

If it is desired that the game apparatus 10 be used exclusively with a compact hand-holdable type video game having a multi-position control which effects movement of an image or character on the video display screen only along the y or vertical axis of the screen, the above described plate 120 and associated actuating arms 124 and 124' and interconnecting linkages 126 and 128 may, if desired, be eliminated.

As described, when the upper portion 40c of the apparatus housing 40 is assembled onto the lower base portion 40a, the joystick 66 projects upwardly through the rectangular opening 56a in the cover plate 56. The opening 56a is defined by mutually perpendicular peripheral edges which are spaced apart to establish predetermined limits for movement of the joystick in fore-and-aft and side-to-side directions relative from its neutral upstanding position. Preferably, a shield plate 154 (FIG. 5) is pivotally supported on the control member 142 through a mounting screw 156 such that the joystick 66 extends upwardly through a circular opening 154a in the shield plate without inhibiting movement of the joystick. The shield plate 154 is of sufficient size to underlie the rectangular opening 56a and prevent entry of debris or the like into the interior of the apparatus housing 40.

Referring to FIGS. 5 and 9 a control or guide member 160 is supported on the underside of the cover plate 56 through a pair of screws 162a and 162b which extend through elongated arcuate slots 164a and 164b, respectively, in the control member so as to enable limited rotational movement of the control member about its geometrical center. The control member 160 has a generally rectangular opening 166 therethrough which is of substantially the same size and configuration as the rectangular opening 56a through the cover plate 56. The control member 160 may be made of a suitable plastic material and has a resilient position-locating detent 160a formed thereon having a projection 160b adapted for releasable registration with either of a pair of relatively shallow recesses 170a and 170b formed in a arcuate shaped block 170 which is also mounted on the underside of the cover plate 54. An arcuate retaining plate 172 is mounted to the outer surface of the arcuate block 170 and creates a channel within which the biasing detent 160a moves upon rotation of the control plate 160.

To effect rotation of the control member 160, a control shaft 174 is fixed to the upper surface of the control member 160, as through a connecting screw 174a (FIG. 9). The control shaft 174 extends through an arcuate slot or opening 56b in the cover plate 56. With the control plate 160 positioned as illustrated in FIG. 9, the mutually perpendicular sides peripherally of the rectangular opening 166 are in substantially vertical alignment with the peripheral edges of the rectangular opening 56a in the cover plate 56 allowing substantially universal movement of the joystick 66; that is, movement of the joystick in substantially any direction within the confines of the rectangular opening 56a. Movement of the control shaft 174 from the left-hand end of the arcuate slot 56b, as shown in FIG. 5, to its opposite end effects substantially 45° rotation of the control or guide plate 160 so that the corners of the rectangular opening 166 lie at the midpoints of the sides of opening 56a. In this position of the control or guide plate 160, the joystick 66 is guided by the edges of the control plate peripherally of the rectangular opening 166 to the midpoints of the edges of the cover plate rectangular opening 56a, thereby reducing the skill level required to move the joystick to its maximum fore-and-aft and side-to-side positions to selectively depress a single one of the arm positions 28a-d of the multi-position control 28 on the video game. This results in quicker control of the game function associated with each of the control arm positions without inadvertently effecting non-intended game functions associated with the other arm portions of the multi-position control 28.

Figure 4:
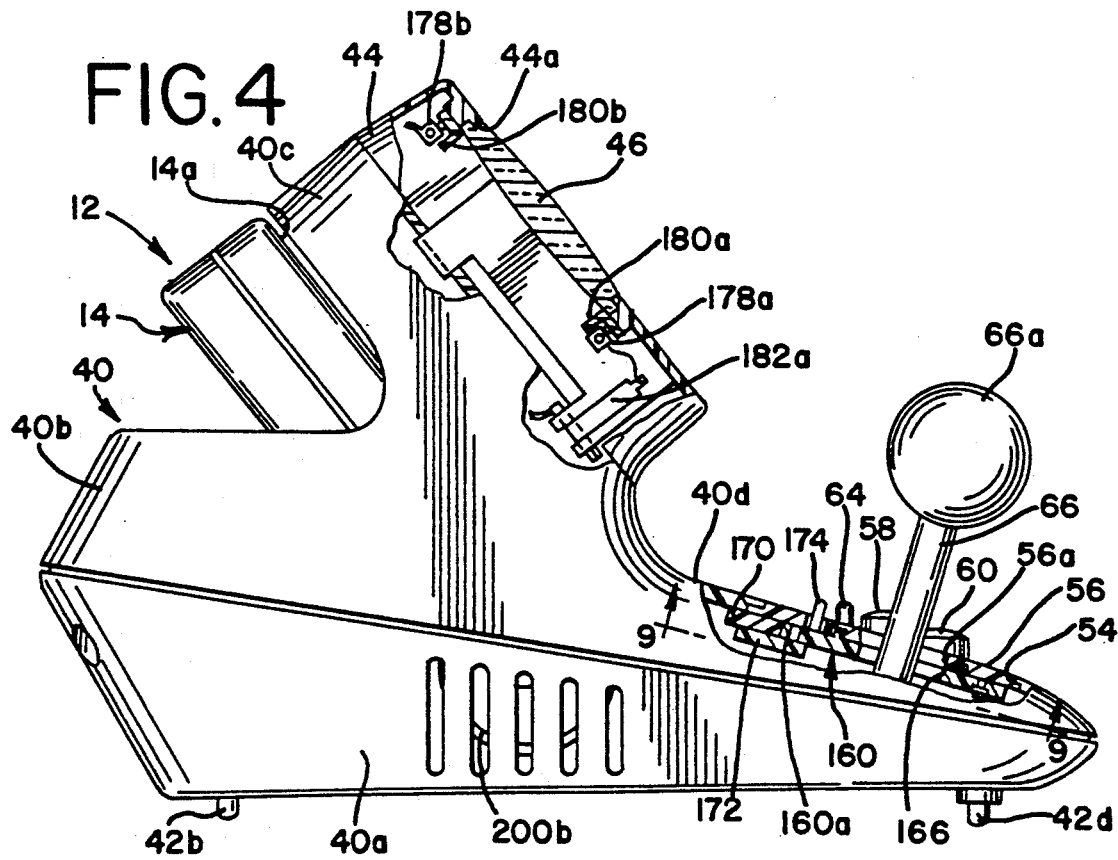
FIG. 4 is an elevational view of the opposite side of the game apparatus illustrated in FIG. 3, portions being broken away for clarity.

As aforedescribed, the magnifying lens 46 magnifies the image created on the LCD screen 18 of the video game 12 when inserted within the recess 50 in the apparatus housing 40. To further enhance the image created on the LCD screen, illumination means in the form of a pair of light bulbs 178a and 178b are mounted along the upper and lower edges of the magnifying lens, as illustrated in FIG. 4. Preferably, a shield member is supported adjacent each of the bulbs 178a and 178b, such as indicated at 180a and 180b, respectively, to shield the bulbs from direct visual observation through the magnifying lens 46 without inhibiting light from the bulbs impinging on the LCD screen.

The light bulbs 178a and 178b are connected through suitable electrical conductors to a pair of conducting contacts 182a (FIG. 4) and 182b (FIG. 5). The contacts 182a and 182b are supported, respectively, on mounting tabs 184a and 184b which are carried by the lens support frame 44 and are adapted to be received within suitable openings 186a and 186b formed in a planar wall 40'c on the upwardly inclined portion 40c of the apparatus housing 40. The tabs 184a,b are configured to releasably retain the magnifying lens frame 44 in assembled relation on the inclined portion 40c of the apparatus housing when inserted within the corresponding openings 186a,b. A second pair of retaining tabs 188a and 188b are also carried by the magnifying lens support frame 44 for releasable connection to the housing portion 40c through suitable rectangular openings 190a and 190b, respectively, in the wall 40'c. The tabs 184a,b and 188a,b and the corresponding openings 186a,b and 190a,b are configured so that the lens support frame 44 may be released from the wall 40'c through a generally rearward sliding and outward withdrawing of the lens support frame.

With the lens support frame 44 mounted on the upwardly inclined portion 40c of the apparatus housing 40, the electrical contacts 182a and 182b engage suitable contacts within the housing 40 which are connected in an electrical circuit such as illustrated schematically in FIG. 10. The electrical circuit may include a printed circuit board 192 (FIG. 5) carried within housing 40 and energized by a d.c. power source in the form of a pair of batteries 194a and 194b housed within the aforementioned battery chamber within the base housing portion 40a bounded by wall 86 (FIG. 3). A power control switch 196 is mounted within housing 40 and has a control arm 196a extending outwardly from the housing to control power to the electrical circuit and thus to the light bulbs 178a and 178b.

An audio pin-plug, indicated schematically at 198 in FIG. 10, is mounted centrally on the transverse base wall 84c of the support bracket 84 so as to extend upwardly in normal relation to the wall 84c. The audio pin-plug 198 is adapted to project into the earphone jack 32 in the video game housing 14 when inserted within the recess 50. The pin-plug 198 transfers audio signals from the video game 12 to a pair of audio speakers 200a and 200b through conventional stereophonic amplifier circuits as illustrated schematically in FIG. 10.

Summarizing the operation of the game apparatus 10, a video game device, such as the video game 12 illustrated in FIG. 2, is inserted into the recess 50 in the apparatus housing 40. In this position, the various actuating arms 82, 82', 124, 124' and 136 overlie the control buttons 22, 24, 26a, 26b and the arm portions 28a-d of the multi-position control 28 on the video game, and the magnifying lens 46 overlies the LCD screen 18. The power circuit within the apparatus 10 may then be energized through switch 196 to illuminate the LCD screen through the light bulbs 178a,b. With the game device 12 energized through its own power supply, depressing the control knob 58 causes a corresponding depression of the control button 22 to "start" the video game program. Thereafter, as the video game format is displayed on the LCD screen, the control knobs 60, 62 and 64 and the joystick 66 may be selectively depressed and manipulated, respectively, to actuate the control buttons 24, 26a and 26b and the multi-position control 28 on the video game, thereby effecting playing of the video game.

Use of the game apparatus 10 to play the video game 12 substantially enhances two-handed play of the video game in a manner simulating a large-scale video game of the type found in video game arcades. The magnifying lens 46 magnifies the LCD screen on the video game so as to present the images and characters depicted on the video screen in a more readily viewable scale which enhances viewing of the LCD screen by persons who otherwise might have difficulty discerning the various images and characters on the display screen.

While a preferred embodiment of the present invention has been illustrated and described, it will be understood to those skilled in the art that changes and modifications may be made therein without departing from the invention in its broader aspects. Various features of the invention are defined in the following claims.

What is claimed is:

1. Apparatus for use with a video game device having a housing supporting a video game including a video display screen, at least one depressible control button and at least one multi-position operating control exposed through a wall of the game device housing and operable from externally of said housing to effect play of the video game; said apparatus comprising, in combination, a housing having a base portion enabling support of the apparatus on a support surface and having a recess adapted to receive and support said video game housing in predetermined relation to said base portion, said apparatus housing having an opening enabling viewing of the video display when the video game device is disposed within said recess, first depressible operator means supported by said apparatus housing in spaced relation from the depressible control button and having actuating lever means selectively operable in response to depression of said depressible operator means from externally of the apparatus housing to actuate the control button on the video game device when disposed within said recess, and second operator means supported on said apparatus housing and including an upstanding joystick selectively operable from externally of the apparatus housing and spaced from the multi-position operating control on the video game device, said second operator means including a plurality of actuating linkages responsive to selective movement of the joystick in generally mutually perpendicular directions to actuate the multi-position operating control on the video game device.

2. Apparatus as defined in claim 1 wherein the video game device includes a plurality of control buttons operative to effect different game functions, said first depressible operator means on said apparatus housing including a plurality of control knobs each of which is selectively operable from externally of the apparatus housing to actuate a selected one of the control buttons on the video game device when disposed within said recess.

3. Apparatus as defined in claim 2 wherein said control knobs are spaced from said recess, and including actuating lever means cooperative with each of said control knobs to depress a corresponding one of the control buttons on the video game device in response to depression of the control knobs.

4. Apparatus as defined in claim 1 wherein said joystick has a generally upstanding control shaft enabling an operator to manipulate the joystick, said actuating linkages being interconnected to said control shaft and responsive to selective movement of the joystick to actuate the multi-position operating control on the video game device when disposed within said recess.

5. Apparatus as defined in claim 4 wherein the multi-position operating control on the video game device has a generally cross-arm configuration defining four depressible arm portions lying on two generally mutually perpendicular axes, said actuating linkages interconnected to said joystick including actuating arm means operative to project into said recess in response to selective movement of the joystick in directions corresponding to said mutually perpendicular axes so as to depress the corresponding arm of the multi-position operating control on the video game device when disposed within said recess.

6. Apparatus as defined in claim 5 including means cooperative with said joystick to guide the joystick in said directions corresponding to said mutually perpendicular axes in response to selective manipulation of the joystick.

7. Apparatus as defined in claim 4 wherein said first depressible operator means supported by said apparatus housing includes a depressible control knob, said actuating lever means being responsive to depression of said control knob to effect depression of a control button on the video game device.

8. Apparatus as defined in claim 7 wherein the video game device includes a plurality of control buttons operative to effect different game functions, said apparatus housing supporting a plurality of control knobs each of which is selectively operable from externally of the apparatus to actuate a selected one of the control buttons on the video game device when disposed within said recess.

9. Apparatus as defined in claim 1 including magnifying lens means supported by said apparatus housing in a position to overlie and magnify the display screen of the video game device when disposed within said recess.

10. Apparatus as defined in claim 1 wherein the video game device includes sound generating means operative to produce a sound during operation of the video game, said apparatus including speaker means supported by said apparatus housing, and circuit means operatively associated with said speaker means and adapted for releasable interconnection to the video game device when inserted within said recess such that sound produced by the video game device during operation is caused to emanate from said speaker means.

11. Apparatus for use with a video game device including a housing having a longitudinal axis and supporting a video game including a video display screen and at least one depressible control button and at least multi-position operating control operable from externally of said housing to effect play of the video game; said apparatus comprising, in combination, a housing having a base portion and an upwardly inclined portion, said apparatus housing further having a recess adjacent said upwardly inclined portion and adapted to receive and support said video game housing with its longitudinal axis disposed at an upwardly inclined angle from horizontal, first operator means including a plurality of control knobs supported by said apparatus housing forwardly of said recess for selective depression from externally of the apparatus housing, said first operator means including actuating arm means associated with each of said control knobs for movement into said recess in response to depression of the corresponding control knob to depress a selected one of the control buttons on the video game device when disposed within said recess, and second operator means including an upstanding joystick supported on said apparatus housing forwardly of said recess, said second operator means including linkage means operative to project into said recess and actuate the multi-position operating control on the video game device in response to manipulation of said joystick.

12. Game apparatus for use with a video game device having a housing supporting a video game including a video display screen and at least one depressible control button and at least one multi-position operating control operable from externally of said housing to effect play of the video game; said game apparatus comprising, in combination, a housing having a base portion enabling the apparatus to be supported in a free standing operating position on a generally horizontal support surface, said apparatus housing further having an upstanding portion inclined upwardly from horizontal and defining a recess adapted to receive and support said video game housing at an upwardly inclined angle from horizontal, magnifying lens means supported by said upstanding portion of said apparatus housing in a position to overlie and magnify the display screen of the video game device when disposed within said recess, first operator means supported by said apparatus housing and including at least one depressible control knob supported on a forward end of the apparatus housing spaced from said recess, and actuating lever means selectively operable in response to depression of said control knob to actuate the control button on the video game device when disposed within said recess, and second operator means including an upstanding joystick supported on said forward end of said apparatus housing and operable from externally of the apparatus housing to actuate the multi-position operating control on the video game device.

13. Game apparatus as defined in claim 12 including illumination means supported within said apparatus housing to enhance the image created on the video display screen for viewing through said magnifying lens means.

14. Game apparatus as defined in claim 12 wherein said apparatus housing includes a magnifying lens means support frame releasably supported on the upstanding inclined portion of the apparatus housing.

15. Apparatus for use with a video game device having a housing supporting a video game including a video display screen, at least one depressible control button and at least one multi-position operating control operable from externally of the housing to effect play of the video game; said apparatus comprising, in combination, a housing having a recess adapted to receive and support said video game housing in predetermined relation, first operator means supported by said apparatus housing and selectively operable from externally of the apparatus housing to actuate the control button on the video game device, and second operator means supported on said apparatus housing and selectively operable from externally of the apparatus housing to actuate the multi-position operating control on the video game device, said video game housing having a generally rectangular configuration establishing an upper surface defining an opening enabling viewing of said video display screen, said depressible control button and said multi-position operating control extending through said upper surface, said recess in said apparatus housing being substantially rectangular and defined in part by a wall disposed in juxtaposed relation to the upper surface of said video game housing when disposed within said recess, said first operator means including an actuator arm pivotally movable between a first position removed from said recess and a second position extending into the recess to depress the control button on the video game in response to actuation of said first operator means.

16. Apparatus as defined in claim 15 wherein said second operator means includes a joystick supported by said apparatus housing, and linkage means cooperative with said joystick and selectively operable to extend into said recess to actuate the multi-position operating control on the video game.

17. Apparatus as defined in claim 16 wherein said linkage means cooperative with said joystick includes a plurality of actuator arms each of which is responsive to a predetermined position of the joystick to extend into said recess and effect predetermined actuation of the multi-position switch on the video game.

* * * * *

UNITED STATES PATENT AND TRADEMARK OFFICE
CERTIFICATE OF CORRECTION

PATENT NO. : 5,213,327
DATED : May 25, 1993
INVENTOR(S) : Kazumi Kitaue

It is certified that error appears in the above-identified patent and that said Letters Patent is hereby corrected as shown below:

Column 11, line 55, before "multi-position" insert --one--.

Signed and Sealed this

Eighteenth Day of January, 1994

BRUCE LEHMAN

Attest:

Attesting Officer

Commissioner of Patents and Trademarks